(12) United States Patent  
Elsen et al.

(10) Patent No.: US 10,860,921 B2  
(45) Date of Patent: Dec. 8, 2020

(54) PARALLEL PROCESSING FOR SIGNAL GENERATION NEURAL NETWORKS

(71) Applicant: DeepMind Technologies Limited, London (GB)

(72) Inventors: Erich Konrad Elsen, San Francisco, CA (US); Sander Etienne Lea Dieleman, London (GB)

(73) Assignee: DeepMind Technologies Limited, London (GB)

(*) Notice: Subject to any disclaimer, the term of this patent is extended or adjusted under 35 U.S.C. 154(b) by 0 days.

(21) Appl. No.: 16/093,682

(22) PCT Filed: Oct. 20, 2017

(86) PCT No.: PCT/US2017/057663  
§ 371 (c)(1),  
(2) Date: Oct. 15, 2018

(87) PCT Pub. No.: WO2019/078890  
PCT Pub. Date: Apr. 25, 2019

(65) Prior Publication Data  
US 2019/0362223 A1 Nov. 28, 2019

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06N 3/02 | (2006.01) |
| G06N 3/063 | (2006.01) |
| G06F 9/50 | (2006.01) |
| G06F 17/16 | (2006.01) |

(52) U.S. Cl.  
CPC .......... G06N 3/063 (2013.01); G06F 9/5066 (2013.01); G06F 17/16 (2013.01)

(58) Field of Classification Search  
CPC ........ G06N 3/063; G06F 9/5066; G06F 17/16  
See application file for complete search history.

(56) References Cited

PUBLICATIONS

Yang X, Parthasarathy S, Sadayappan P. "Fast sparse matrix-vector multiplication on GPUs: implications for graph mining." Proceedings of the VLDB Endowment. Jan. 1, 2011; 4(4):231-42. (Year: 2011).*

Han S, Liu X, Mao H, Pu J, Pedram A, Horowitz MA, Dally WJ. "EIE: efficient inference engine on compressed deep neural network." In 2016 ACM/IEEE 43rd Annual International Symposium on Computer Architecture (ISCA) Jun. 18, 2016 (pp. 243-254). IEEE. (Year: 2016).*

(Continued)

*Primary Examiner* — Luis A Sitiriche  
(74) *Attorney, Agent, or Firm* — Fish & Richardson P.C.

(57) ABSTRACT

Methods, systems, and apparatus, including computer programs encoded on computer storage media, for executing a signal generation neural network on parallel processing hardware. One of the methods includes receiving weight matrices of a layer of a signal generation neural network. Rows of a first matrix for the layer are interleaved by assigning groups of rows of the first matrix to respective thread blocks of a plurality of thread blocks. A first subset of rows of the one or more other weight matrices are assigned to a first subset of the plurality of thread blocks and a second subset of rows of the one or more other weight matrices are assigned to a second subset of the plurality of thread blocks. The first matrix operation is performed substantially in parallel by the plurality of thread blocks. The other matrix operations are performed substantially in parallel by the plurality of thread blocks.

14 Claims, 5 Drawing Sheets

(56) References Cited

PUBLICATIONS

Arik et al. "Deep Voice Real-time Neural Text-to-Speech," arXiv 1702.07825, Feb. 24, 2017, 17 pages (Year: 2017).*
Arik, Sercan "Deep Voice: Real-time Neural Text-to-Speech," arXiv: 1702.07825v2. Feb. 24, 2017. (Year: 2017).*
Jafri, Syed M.A.H. "Speed: Open-Source Framework to Accelerate Speech Recognition on Embedded GPUs," 2017 Euromicro Conference on Digital System Design (DSD), Vienna, 2016, pp. 94-101, Aug. 30, 2017. (Year: 2017).*
Yang, Xiantian, "Fast Sparse Matrix-Vector Multiplication on GPUs: Implications for Graph Mining," Proceedings of the VLDB Endowmenet, vol. 4, No. 4, Aug. 29, 2011. (Year: 2011).*
Abdi et al. "Multi-Residual Networks: Improving the Speed and Accuracy of Residual Networks," arXiv 1609.05672v4, Mar. 15, 2017, 8 pages.
Arik et al. "Deep Voice Real-time Neural Text-to-Speech," arXiv 1702.07825, Feb. 24, 2017, 17 pages.
Hassan et al. "Speed: Open-Source Framework to Accelerate Speech Recognition on Embedded GPUs," IEEE EUROMICRO Conference on Digital System Design, Aug. 30, 2017, 8 pages.
International Search Report and Written Opinion issued in International Application No. PCT/US2017057663, dated Jul. 11, 2018, 15 pages.
Van den Oord et al. "WaveNet: A Generative Model for Raw Audio," arXiv 1609.03499v2, Sep. 19, 2016, 15 pages.
PCT International Preliminary Report on Patentability in International Appln. No. PCT/US2017/057663, dated Apr. 30, 2020, 9 pages.

\* cited by examiner

US 10,860,921 B2

PARALLEL PROCESSING FOR SIGNAL GENERATION NEURAL NETWORKS

CROSS-REFERENCE TO RELATED APPLICATION

This application is a National Stage application under 35 U.S.C. § 371 of International Application No. PCT/US2017/057663, filed on Oct. 20, 2017. The content of the prior application is incorporated herein in its entirety.

BACKGROUND

This specification relates to techniques for efficient parallel processing of audio and image generation neural networks.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. The transformation operations of each layer can be performed by computers having installed software modules that implement the transformation operations. Thus, a layer being described as performing operations means that the computers implementing the transformation operations of the layer perform the operations.

Some types of neural networks have significant throughput requirements. For example, audio generation neural networks present significant computational challenges because of the basic high-throughput nature of raw audio generation. A raw audio waveform represents pressure variations of sound traveling in a medium over time, e.g., pressure variations over time due to sound traveling in air. A raw audio waveform can be numerically encoded as a series of values, one value for each of multiple time steps. Each value, which may be referred to as a sample, can represent the amplitude of the raw audio waveform at a particular point in time. For example, 16-bit raw audio encodes each sample using 16 bits, with each possible value of the 16 bits representing one possible amplitude value. The audio sample at each time step can also be a compressed or companded representation of the waveform at the corresponding time. For example, the audio sample can be a μ-law transformed representation of the waveform. Computer-implemented applications for raw audio generation include text-to-speech (TTS) applications, in which plain text is converted into an artificially generated audio waveform that, when played on an appropriate output device, generates audio of a person speaking the text.

Realistic audio generation typically requires multiple thousands of samples to be generated per second, e.g., 24,000 samples per second. In addition, each predicted sample depends on a number of previously predicted samples, which means that an inference pass in an audio generating neural network requires a large number of sequential operations that can be hard to parallelize.

In addition, the high sample rates of raw audio waveforms also impose significant memory bandwidth challenges. In some cases, storing the weights of an audio generation neural network as 32-bit floats can require memory bandwidth on the order of 400 GB per second.

One example of an audio generation neural network is a WaveNet. WaveNets were initially described in van den Oord et al., *WaveNet: A Generative Model for Raw Audio*, in arXiv preprint arXiv:1609.03499 (2016), available at arxiv.org. A WaveNet is a deep neural network that models the conditional probability of a sample having a particular value given a particular number of previously occurring sample values.

FIG. 1 illustrates a portion of a prior art WaveNet 100. The WaveNet 100 generally includes a stack 101 of causal convolutional layers. A WaveNet stack 101 typically includes between 10 and 40 causal convolutional layers.

All causal convolutional layers in the stack 101 have a skip connection, and all but the last causal convolutional layers in the stack 101 have a residual connection. Each residual connection provides an input to a subsequent causal convolutional layer in the stack 101. The outputs of the skip connections are summed together, and the result is further processed to generate a current audio sample output 146 for the sequence.

The activation function z for each layer k satisfies Equation (1):

$$z = \tanh(W_{f,k} * x) \odot \sigma(W_{g,k} * x), \qquad (1)$$

where $W_{f,k}$ is the main filter for the layer k, x is the layer input from the residual connection, * denotes a causal dilated convolution, $\odot$ denotes element-wise multiplication, and $W_{g,k}$ is the gate filter for the layer k.

The layer applies 1×1 convolutions 116 to the activation function output, which is used to generate the skip connection output 118 and the residual connection output 120. For the residual connection, the output of the 1×1 convolution 116 is summed with the original layer input 106. For the skip connection, the output of the 1×1 convolution 116 is summed with all other skip connection outputs.

When these operations are implemented in processing hardware, each layer in the stack 101 has three primary matrix operations. These three primary matrix operations all carry the potential to be computational bottlenecks.

The first primary matrix operation is the convolutions 108. Equation (1) specifies two different convolution operations, but in practice, these can be performed as a single matrix operation by combining $W_{f,k}$ and $W_{g,k}$ into a single matrix and concatenating the input vector for x with a previously generated value for x. The second and third primary matrix operations are the 1×1 convolutions 116 of the activation function output with a residual weight matrix and a skip weight matrix.

A similar structure to that described above may be employed to generate images and video additionally or alternatively to audio. Thus an example of an image generation neural network using the above approach is the PixelCNN neural network. In broad terms both these are examples of autoregressive neural networks in which values of a signal, more particularly output data representing a distribution of values of a signal, are generated based upon previously generated values of the signal. When conditioned upon an input, for example, but not necessarily, a signal of a different type, such neural networks may be used to generate speech or images from text.

Some prior art approaches have attempted to leverage parallel processing techniques by executing WaveNets using graphics processing units (GPUs). GPUs typically have multiple independent streaming multiprocessors (SMs) that each independently execute a respective thread block. For example, one approach to using GPUs assigns the operations of each layer in the stack 301 to a respective SM. In this approach, all operations of a single layer can be performed without performing any synchronization between the SMs. However, a major drawback of this approach is that the number of layers in the WaveNet may not conveniently correspond to the number of SMs in the GPU. For example, if the WaveNet has 30 layers and the GPU has 64 SMs, the GPU will achieve less than 50% utilization. To get 100% utilization, the WaveNet could be redesigned to have 64 layers. However, in practice this number of layers is not feasible given the extreme latency requirements of generating raw audio waveforms. Image and video generation may also require high speed computation. In addition, the pipelining approach is tends to be overly rigid in that it is very difficult to scale and different to apply to multiple different types of processing hardware.

SUMMARY

This specification describes how a system can implement a signal generation neural network, e.g., a neural network that generates audio, images, text or any other appropriate one-dimensional data stream, on parallel processing hardware. In doing so, some matrix operations can be performed in parallel by all available processing units, and other matrix operations can be performed in parallel by subsets of available processing units. The neural network may be an autoregressive neural network.

Thus in one aspect a method comprises receiving three weight matrices of a layer of a plurality of layers of a signal generation neural network. Each layer of one or more layers in the neural network may have a residual connection to a subsequent layer. Each layer of the plurality of layers may also have a skip connection. For each layer, respective first, second and third weight matrices may comprises values for a respective first, second and third matrix operations of the layer. In preferred implementations both the second matrix operation and the third matrix operation depend on a result of the first matrix operation. The method may include interleaving rows of a first matrix for the layer by assigning groups of rows of the first matrix to respective thread blocks of a plurality of thread blocks, each thread block being a computation unit for execution by an independent processing unit of a plurality of independent processing units of a parallel processing device. The method may also comprise assigning groups of rows of the second matrix to a first subset of the plurality of thread blocks and assigning groups of grows of the third matrix to a second subset of the plurality of thread blocks. The method may further comprise receiving, by the layer, an input vector; performing, by the plurality of thread blocks, the first matrix operation substantially in parallel; performing, by the first subset of the plurality of thread blocks, the second matrix operation substantially in parallel with performing, by the second subset of the plurality of thread blocks, the third matrix operation; and outputting a result computed from the second matrix operation to the residual connection in the network and outputting a result computed from the third matrix operation to the skip connection in the network.

As described further later examples of such methods can provide advantages such as faster, more efficient and/or reduced power implementation of computations for a neural network.

In some preferred implementations the method may also include performing a synchronization with the plurality of thread blocks. For example this may comprise the thread blocks writing results of the first matrix computation to a storage area which may then be accessed for subsequent computations, in particular by the thread blocks performing the second and third matrix operations. This facilitates efficient operation of the computations.

In some example implementations the first subset of the plurality of thread blocks and the second subset of the plurality of thread blocks are non-overlapping. This is advantageous because it facilitates parallel operation, and also helps load balancing amongst multiple processors performing the thread block computations. In some examples the first subset of the plurality of thread blocks comprises half of the available thread blocks, and wherein the second subset of the plurality of thread blocks comprises another half of the available thread blocks.

Interleaving rows of the first matrix of the layer may comprise assigning, to each thread block, at least one row of each of the three weight matrices. In some implementations the first matrix has a number of rows that is a multiple of a number of independent processing units of the parallel processing device. The second matrix may have a number of columns that is a multiple of a number of threads within a warp of the parallel processing device. The third matrix may have a number of columns that is a multiple of a number of threads within a warp of the parallel processing device. All these features can contribute to efficient implementation of the computations of a plurality of processors, for example of a GPU.

Particular embodiments of the subject matter described in this specification can be implemented so as to realize one or more of the following advantages. An audio generation neural network deployed on parallel processing hardware in accordance with this specification can be used to generate audio samples in real-time. The techniques described below can be easily adapted to fit the specifics of any target parallel processing hardware. Furthermore, the number of layers in the network does not depend on the hardware.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
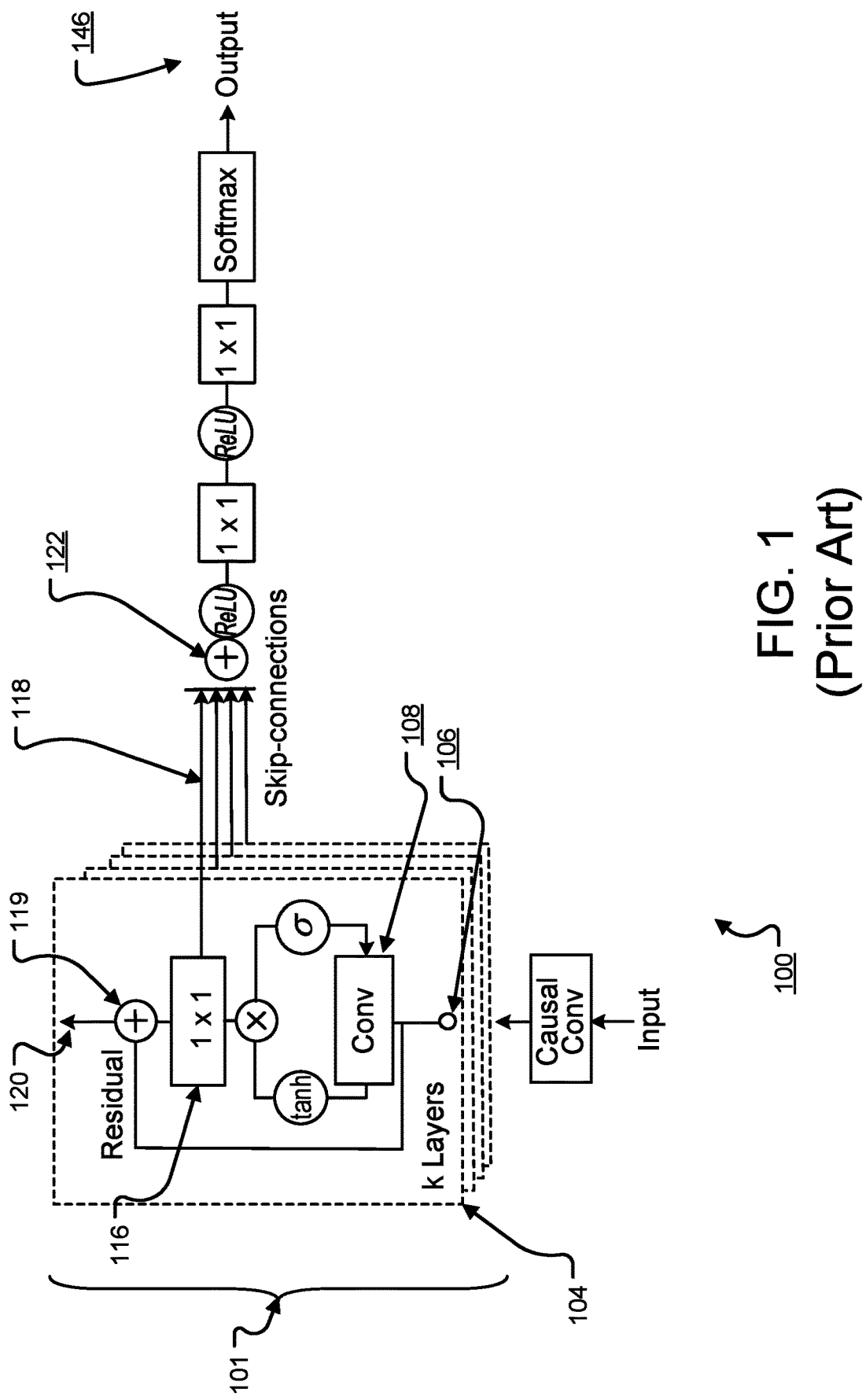
FIG. 1 illustrates a portion of a prior art WaveNet.

This specification describes how a neural network system can improve the throughput and latency of an audio generation neural network using multiple independent processing units of a parallel processing device. The examples described below will commonly refer to the independent processing units being streaming multiprocessors (SMs) having multiple processing cores and the parallel processing device being a graphics processing unit (GPU). However, the same techniques can also be implemented on other hardware devices that implement true thread parallelization with multiple independent processing units. Such devices include single instruction, multiple data (SIMD) processors generally, tensor processing units (TPUs), or other application-specific integrated circuits. In addition, where the examples mention the use of a GPU, this does not necessarily imply that graphics data is being processed or produced.

On such parallel processing devices, control over thread parallelization can be provided by program abstractions that define how threads are assigned to be executed by the multiple independent processing units. For clarity of presentation, this specification uses the terminology of common GPU program abstractions, but equivalent program abstractions that control how threads are scheduled on independent processing units can be used for other systems that are not GPUs.

A thread block, or for brevity, a block, is a group of threads that are executed by a single SM. Threads in a block can coordinate by making use of shared memory of the SM. Communication between threads in a block is therefore typically orders of magnitude faster than communicating with threads in other blocks.

A warp is a group of threads within a block and in some cases represents the smallest assignable unit of computation for a GPU. Threads in a warp typically execute instructions in lockstep. Thus, threads within a warp can, for example, fetch data from memory together. If the data required for each thread is stored in the same memory segment, all threads within a warp can read from memory with only one memory transaction. Common warp sizes are 16, 32, or 64 threads, to name just a few examples.

During execution, each block is assigned to be executed by one respective SM. The threads within the block execute on the SM until the block is complete, at which point another block can be executed by the SM. For SMs that have multiple processing cores, sometimes referred to as signal processors or execution lanes, each processing core can execute one thread. GPUs commonly have between 10 and 100 SMs, and each SM can have between 2 and 32 processing cores. Therefore, the GPU can therefore often execute hundreds of threads in parallel.

In order for blocks to make their computed data available to other blocks, the blocks must coordinate by performing a synchronization, or for brevity, a sync. Syncs are expensive performance-wise because executing the sync requires stopping execution of one or more blocks to wait. A synchronization requires all blocks to write their data to a place where another block can access it. The synchronization location can be for example in RAM or the L2 cache.

In this specification, interleaving matrix operations of a matrix means that a majority of blocks available for matrix operations in a parallel processing device, if not all the blocks available for matrix operations or even all blocks of the device, will operate on some data from the matrix.

On the other hand, in this specification concatenating matrix operations of a matrix means assigning operations to all warps available for matrix operations in a first block, then to all warps available for matrix operations in a second block, and so on until all of the matrix operations have been assigned to a warp. Therefore, concatenating matrix operations does not necessitate all blocks having data from the matrix.

Figure 2A:
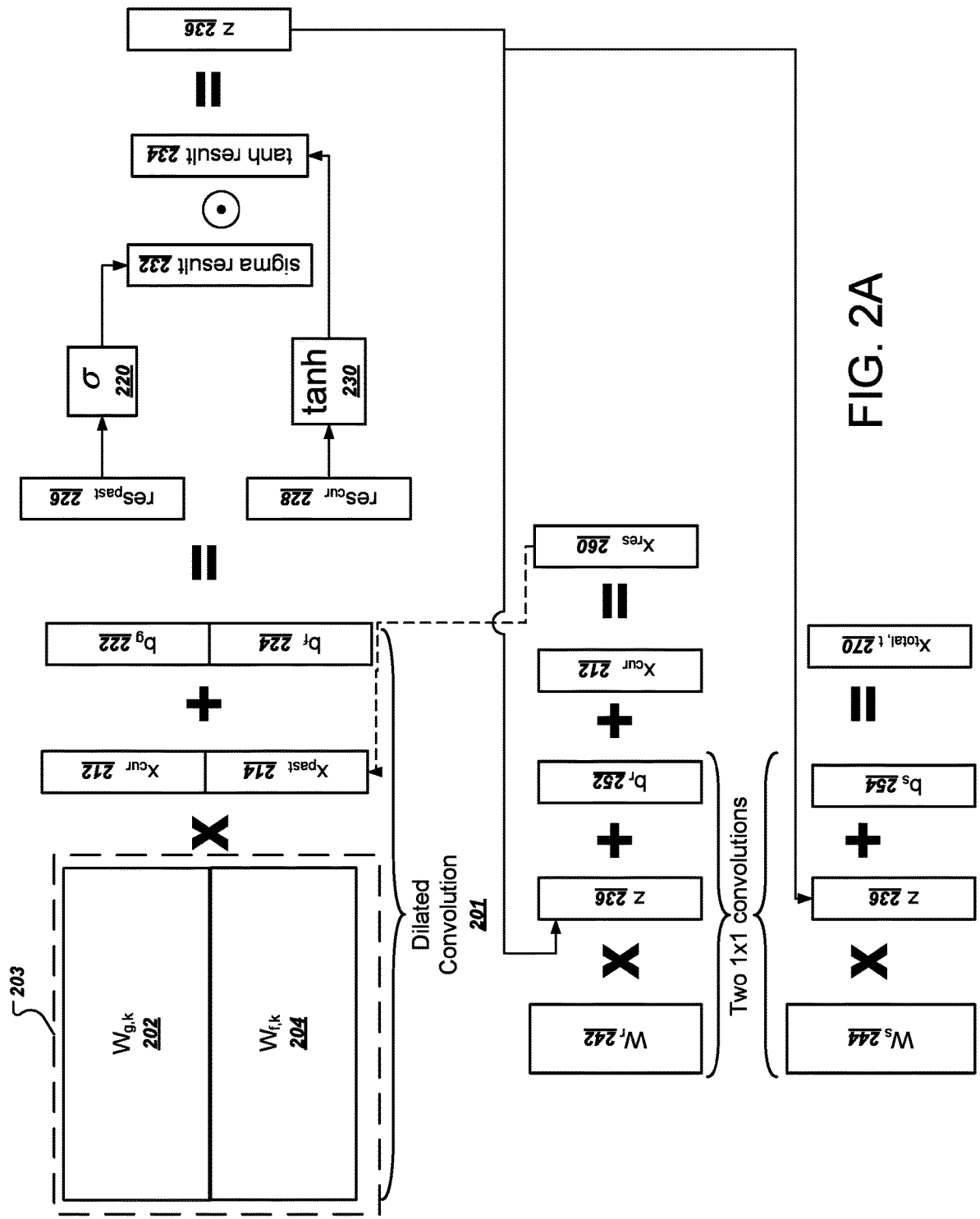
FIG. 2A is a diagram that illustrates the three primary matrix operations for one layer of a WaveNet.

FIG. 2A is a diagram that illustrates the three primary matrix operations for one layer of a WaveNet. In general, each layer includes a separate set of weights and biases for each of the matrix operations.

The input to the layer is the vector xcur 212. In other words, this is the result computed by the previous layer in the network, or it is the initial input to the layer stack network.

The outputs of the layer are (1) the residual output $x_{res}$ 260, which is provided to the residual connection as input to the subsequent layer in the network, and (2) the skip output $x_{total\_k}$ 270, which is provided to the skip connection to be summed with the output of all other skip connections.

Figure 3:
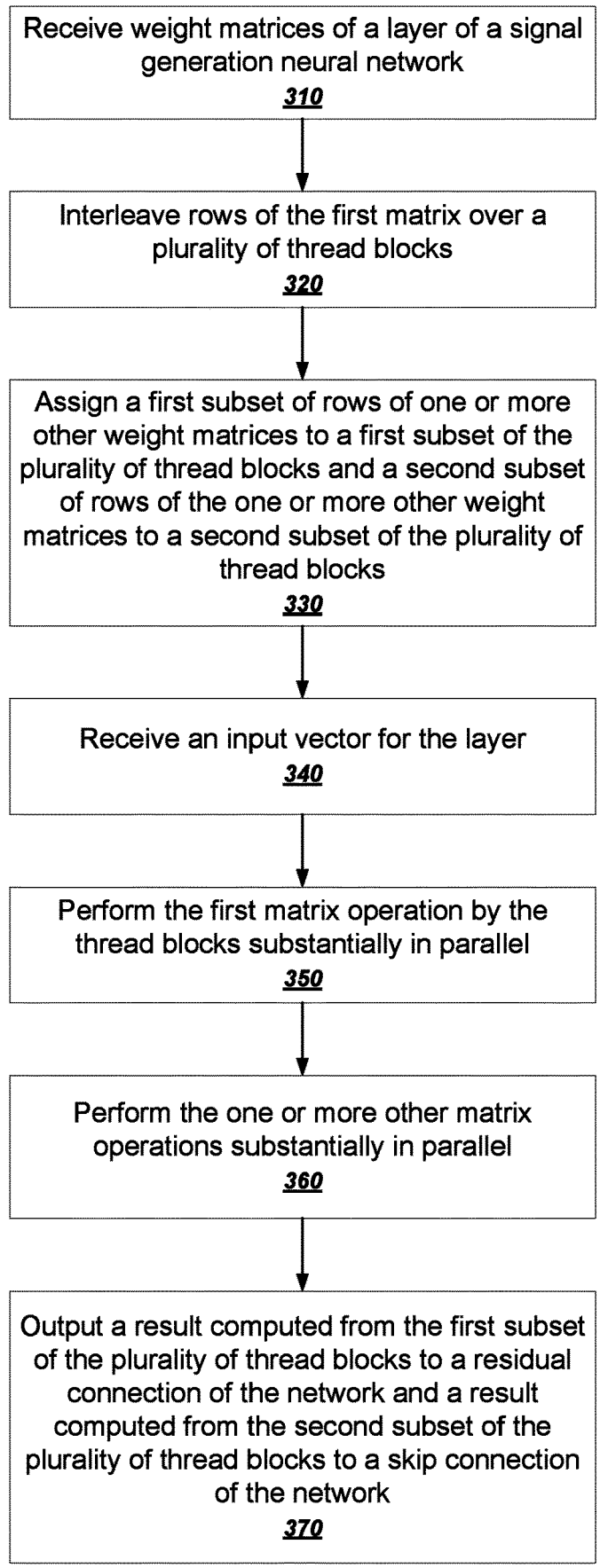
FIG. 3 is a flowchart of an example process for performing the operations of one layer of a signal generation neural network.

The vector $x_{past}$ 214 is the residual output computed on the last iteration of the layer. Thus, after computing $x_{res}$ 260, the system can update $x_{past}$ 214 with the new value for $x_{res}$. In FIG. 3, this updated is represented by the dashed line between the vectors 260 and 214. In some implementations, the system uses a circular buffer to store the results of $x_{res}$ 260 and simply updates a pointer in order to update the value of $x_{past}$ 214.

The first matrix operation is part of a dilated convolution 201. The dilated convolution 201 specifies a matrix multiplication of a gate weight matrix 202 by $x_{cur}$ 212, which is the current vector input for the layer, e.g., the vector generated by a previous layer. The dilated convolution 201 also specifies a matrix multiplication of a filter weight matrix 204 by $x_{past}$ 214, which is the residual output computed from the previous iteration of the layer. The gate weight matrix 202 and the filter weight matrix 204 may be collectively referred to as the dilated convolution weight matrix 203.

The dilated convolution 201 also specifies the addition of bias vectors 222 and 224 corresponding respectively to the gate weight matrix 202 and the filter weight matrix 204.

Each half of the dilated convolution result, $res_{past}$ 226 and $res_{cur}$ 228 is then fed through the sigma activation function 220 and the tan h activation function 230 respectively. The sigma activation function 220 generates a sigma result 232, and the tan h activation function 230 generates a tan h result 234. An element-wise multiplication between the sigma result 232 and the tan h result 234 results in a vector z 236, representing the result of the activation function given by Equation (1) above.

The second matrix operation is part of a 1×1 convolution between a residual weight vector $W_r$ 242 and z 236. A residual bias vector $b_r$ 252 is also added to the result, which, as illustrated by addition operation 119 in FIG. 1, is the summed with the original vector $x_{cur}$ 114, to generate $x_{res}$ 160. The result of $x_{res}$ 260 is both used as output for the layer and as the new value for $x_{past}$ 214.

The third matrix operation is part of a 1×1 convolution between a skip weight vector $W_s$ 244 and z 236. A skip bias vector $b_s$ 254 is also added to the result to generate $x_{total\_k}$ 270 for the layer k.

Figure 2B:
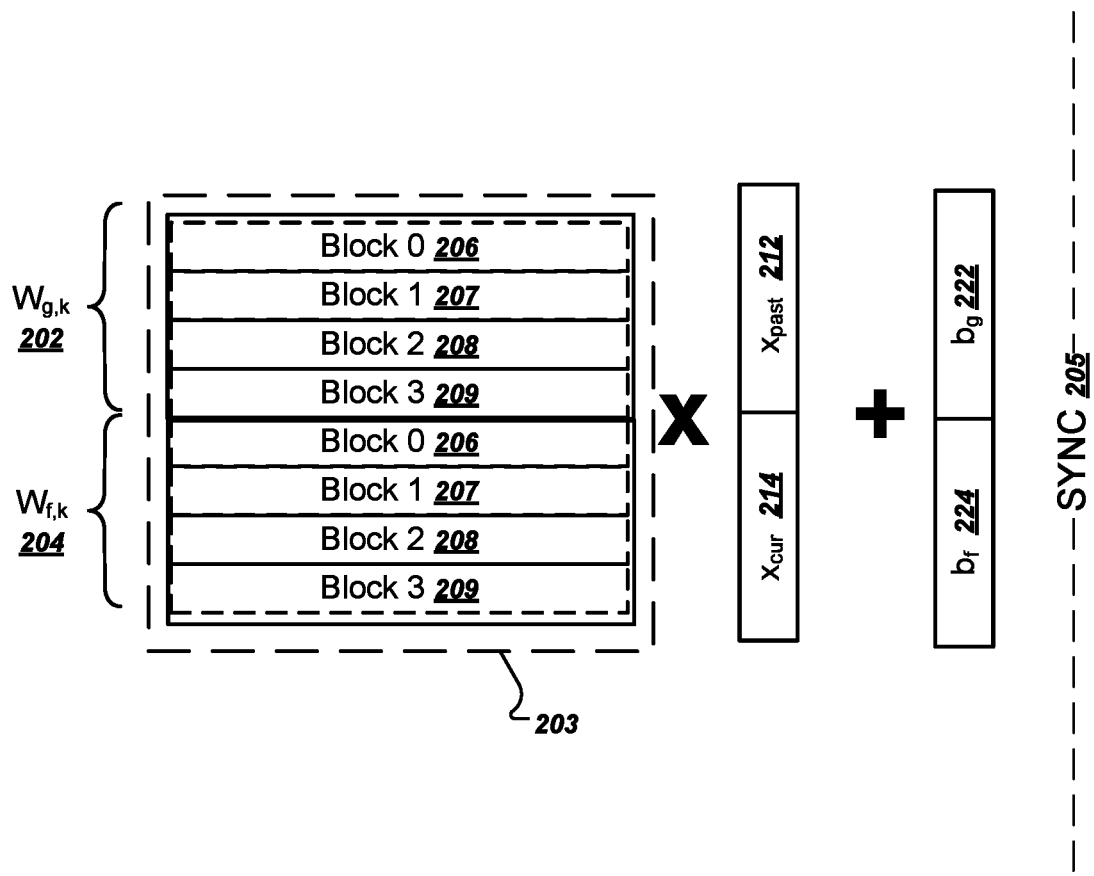
FIG. 2B illustrates how the computations of the first matrix operation can be interleaved on a parallel processing device.

FIG. 2B illustrates how the computations of the first matrix operation can be interleaved on a parallel processing device. This allows the computations of the first matrix operation to be computed in parallel by all available SMs.

In this context, assigning one or more operations to threads in a block means allocating a thread defining the one or more operations in the block and copying the data required to perform the one or more operations into registers allocated to the thread. Then, the thread can be executed to generate a result for the one or more operations. In some parallel processing devices, a warp is the smallest assignable unit of work. Therefore, assigning operations to threads may actually involve assigning multiple operations to a warp containing the threads.

For simplicity, the example in FIG. 2B assumes a processing device having just 4 SMs that each execute a corresponding block, although modern parallel processing devices can have, and typically do have, many more than 4 SMs.

In this example, the rows of the matrices 202 and 204 are interleaved among the blocks 206, 207, 208, and 209. This means that each block will receive some rows of each matrix. In some implementations, the assignment of rows to blocks is grid strided, meaning that after all blocks are assigned some subset of rows, block 0 will receive the next set of rows to be assigned.

As described above, on some parallel processing devices, a warp is the smallest assignable unit of work. Therefore, individual rows can be assigned to respective warps belonging to the block. The rows that are assigned to a single warp can be assigned in any appropriate way, e.g., continuously or grid-strided. This can result in the matrices being interleaved at the warp level in addition to being interleaved at the block level. In other words, every warp is assigned some values from all three weight matrices. In addition, the matrices can also be interleaved at the thread level, meaning that every thread can be assigned some values from all three weight matrices.

As shown in FIG. 2B, block 0 206 receives the matrix weights for one or more of the first rows of $W_{g,k}$ 202. Block 0 206 also receives the weights for one or more of the first rows of $W_{f,k}$ 204. In some implementations, the system stores each matrix value with half precision, which allows each register to store two matrix values. Thus, each thread in the block can allocated a single register to store two adjacent row values.

The vectors $x_{past}$ 212 and $x_{cur}$ 214 can be broadcast in their entirety to all the blocks, or their rows can be interleaved in the same way that the rows of the matrices 202 and 204 were interleaved so that only the portions of $x_{past}$ 212 and $x_{cur}$ 214 that are required to perform the matrix operations are distributed to the blocks.

By interleaving the matrices 202 and 204 among all available blocks, the system can compute the matrix multiplication operations of the dilated convolution in parallel over multiple independent processing devices.

In some implementation, the system can improve processing utilization and load balancing by training a model to exactly fit the available processing hardware. This can in some cases lead to substantially full occupancy or even full occupancy on the parallel processing hardware.

To do so, the system can define the dilated convolution weight matrix 203 to have a number of rows that is a multiple of the number of available parallel processing units, e.g., SMs, in the hardware. For example, if a GPU has 60 SMs, the system can define the dilation weight matrix to have 120 rows, which will result in each one of the blocks being assigned two rows each.

In addition, the system can define the dilated convolution weight matrix 203 to have a number of columns that is a multiple of the number of threads per block. For example, if a GPU has 256 threads per block, the system define the dilated convolution weight matrix 203 to have 512 columns.

Thus, if a block having 256 threads is assigned two rows of 512 columns each, then each thread can be assigned just 4 values. If the values are stored in half precision, the 4 values may occupy only 2 registers.

On devices that require assignment by warps instead of individual threads, the system can partition rows assigned to a block into warps. The values in the rows can be assigned to warps in any appropriate way, for example, continuously or block strided. In this case, the system can alternatively or in addition define the dilated convolution weight matrix 203 to have a number of columns that is a multiple of the number of warps in a block. The previous numerical example was for a single layer of the network. The system can also preload the thread blocks with values for every layer in the network. Thus, if the network has 30 layers, each thread can be assigned 120 values, which may occupy 60 registers if stored in half precision.

The system can also preload the thread blocks with all the bias values for every layer in the network. The system can reduce the number of registers that are required to store the bias values by assigning the bias vectors to for a layer to one thread. Then, that thread can perform the final bias addition and write to memory for the final result. For example, the system can assign thread 0 to store the bias vector for layer 0, thread 1 to store the bias vector for layer 1, and so on.

Because the matrix operations occur on different blocks, a synchronization 205 among blocks is required in order to assemble the result of the dilated convolution for further processing. Although synchronizations are generally expensive, incurring a synchronization at this point is advantageous because doing so allows for maximum load balancing and parallel computation for the first matrix operation. This greatly reduces the amount of time required for an inference pass in an audio generation neural network relative to the pipelining approach described above, and also provides for much greater flexibility and scalability.

Figure 2C:
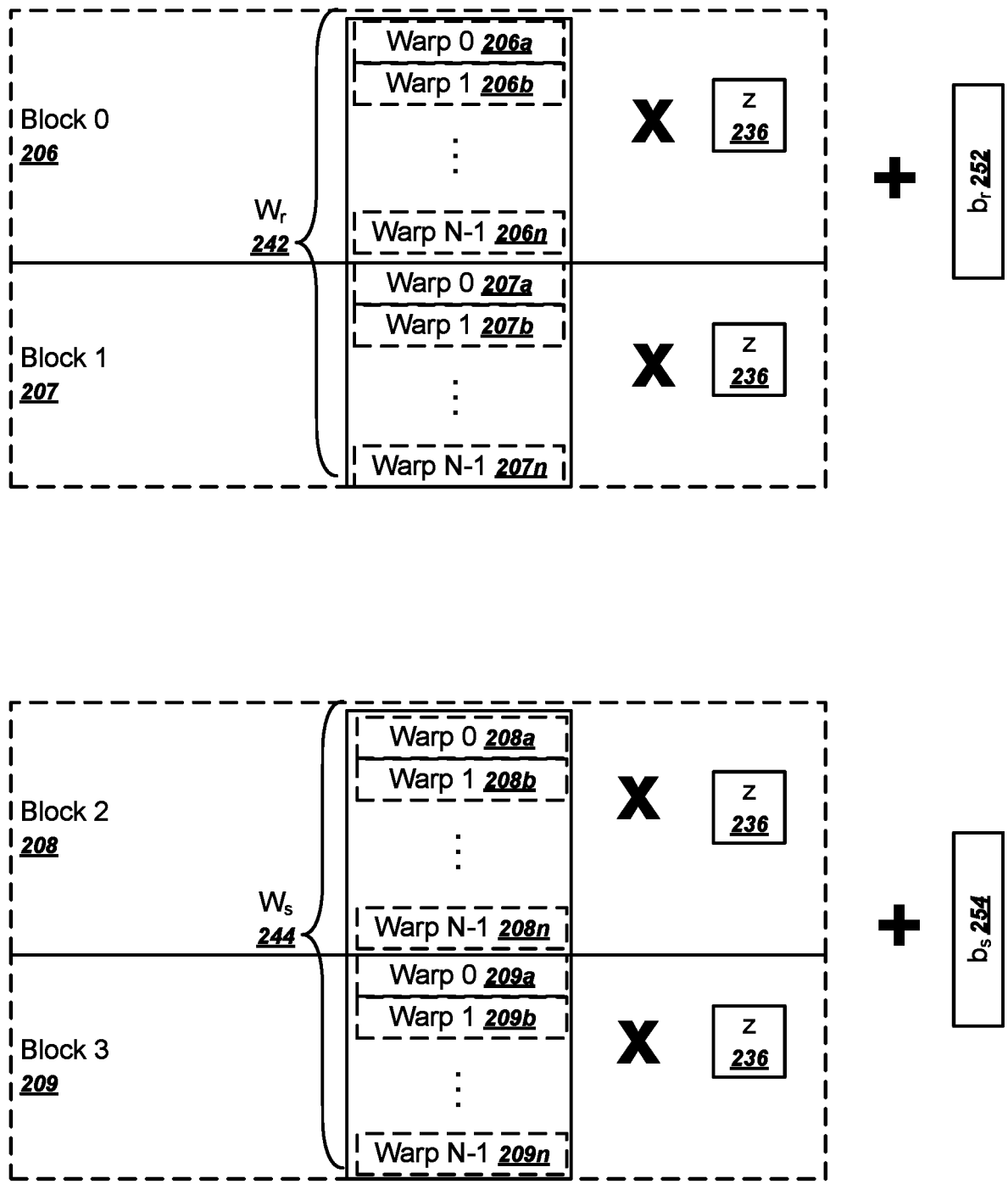
FIG. 2C illustrates how the computations of the second and third matrix operations can be performed by parallel processing hardware.

FIG. 2C illustrates how the computations of the second and third matrix operations can be performed by parallel processing hardware.

As shown in FIG. 2C, a first portion of the available blocks, e.g., the blocks 206 and 207 can be used to perform the second matrix operation, and a second portion of the available blocks, e.g., the blocks 208 and 209 can be used to perform the third matrix operation. In some implementations, the system assigns half of the available blocks to the residual weight matrix $W_r$ 242 and half of the available blocks to the skip weight matrix $W_s$ 244. In this example, block 0 206 and block 1 207 are assigned to perform the second matrix operation using the residual weight matrix $W_r$ 242; and block 2 208 and block 3 209 are assigned to perform the third matrix operation using the skip weight matrix $W_s$ 244. However, the block assignments need not be continuous or even related, as each block can perform its operations independently.

The rows of the residual and skip matrices 242 and 244 are typically small enough so that each warp can be assigned one or more complete rows. As shown in FIG. 2C, warp 0 206a is assigned all the values of the first row of $W_r$ 242, warp 1 206b is assigned all values of the second row, and so on, up to the last warp, warp n−1 206n, of block 0 206 being assigned the last row of $W_r$ 242. Within a warp, each thread will be assigned one or more values, which, as described above, may be stored in half precision with two values per register. Likewise, in block 1, warps 207a-n can each be assigned one or more complete rows of $W_r$ 242.

The rows of the skip matrix $W_s$ 244 can be similarly assigned to warps 208a-n in block 2 208 and warps 209a-n of block 3 209.

As described above, the system can improve latency and load balancing by training a model to substantially or exactly fit the available processing hardware. In this case, the system can define the residual weight matrix $W_r$ 242 and the skip weight matrix $W_s$ 244 to have a number of columns that is as close as possible to a multiple of the number of threads in a warp. For example, if there are 32 threads in a warp, each of the residual weight matrix $W_r$ 242 and the skip weight matrix $W_s$ 244 can have a multiple of 32 columns, e.g., 32, 64, or 128 columns.

In some cases, it is not possible to reconcile the number of rows of the activation function result z 236, which depends on the number of independent processing units, with the number of threads in a warp. But in practice it is usually better to have some vacancy in the warps rather than to have imperfect load balancing of the independent processing units. Thus, for example, if a device has 60 SMs and 32 threads per warp, the system can choose to generate a model in which the activation function result z has 60 rows, i.e., choosing load balancing of the SMs over load balancing of the warps, even if this means that some warps will carry less of a load than others. If however, the device has 64 SMs and 32 threads per warp, the system can optimize the load balancing of both the SMs and the warps.

To perform the second matrix operation, the residual weight matrix $W_r$ 242, partitioned across blocks 0 and 1, is multiplied by the activation function result z 236. And to perform the third matrix operation, the skip weight matrix $W_s$ 244, partitioned across blocks 2 and 3, is also multiplied by the activation function result z 236. Because each of these operations is allocated to independent blocks, both the second and third matrix operations can be computed substantially in parallel.

The activation function result z 236 can be broadcast to all blocks for performance of the second and third matrix operations, and rows of z 236 can be distributed among warps having corresponding rows required to perform the second and third matrix operations.

As described above, a residual bias vector $b_r$ 252 is added to the result of the second matrix operation, and a skip bias vector $b_s$ 254 is added to the result of the third matrix operation.

Each bias vector 252 and 254 has as many values as rows in the corresponding matrices $W_r$ 242 and $W_s$ 244. Therefore, there is only one bias value to store per row, and each warp will be assigned as many bias values as rows from the matrices $W_r$ 242 and $W_s$ 244.

For a particular row assigned to a warp, the corresponding bias value can be stored in a register belonging to any one of the threads in the warp. The thread having the bias value can then perform the addition of the bias value with the result of the matrix multiplication. Alternatively or in addition, the bias value can be partitioned among multiple threads in the warp.

There are as many residual and skip bias vectors as there are layers in the network. Therefore, each warp can store, in one or more threads of the warp, one bias value for each row assigned to the warp in each layer in the network.

FIG. 3 is a flowchart of an example process for performing the operations of one layer of a signal generation neural network. Some of the actions described in FIG. 3 are performed by independent processing units of a parallel processing device, while some of the actions are preparatory actions that a deployment system having at least one central processing unit performs to load the appropriate data into memory of the independent processing units. In addition, some actions that relate to generating matrices of the model can be performed by any appropriately programmed system of one or more computers. For convenience, the process will be described as being performed by a system having all of these components, appropriately programmed in accordance with this specification.

The system receives weight matrices of a layer of a signal generation neural network (310). Each layer of the neural network has a residual connection to a subsequent layer, except for the last layer, and each layer of the plurality of layers has a skip connection. As described above, the general computation of one layer can involve three matrix operations, in which the second and third matrix operations depend on the result of the first matrix operation. In some implementations, the first matrix operation is a dilated convolution, and the second and third matrix operations are 1×1 convolutions.

The system interleaves rows of the first matrix over a plurality of thread blocks (320). As described above, the system can assign some rows of the first matrix to all available thread block of a parallel processing device in order to utilize all available independent processing units of the parallel processing device when computing the first matrix operation. In some implementations, the first matrix comprises a gate weight matrix and a filter weight matrix for a dilated convolution of an audio generation neural network.

The system can generate the gate weight matrix and the filter weight matrix by training a model for a particular target computing device. As described above, the system can generate the model such that the gate weight matrix and the filter weight matrix has a number of rows that is a multiple of the number of independent processing units of the target computing device.

The system assigns a first subset of rows of one or more other weight matrices to a first subset of the plurality of thread blocks and a second subset of rows of the one or more other weight matrices to a second subset of the plurality of thread blocks (330). As described above, the first subset and the second subsets can be nonoverlapping subsets, in other words proper subsets, of the plurality of thread blocks. In some implementations, the first subset includes half of the thread blocks, and the second subset includes the other half of the thread blocks. As part of this process, the system can assign whole rows to respective warps.

The second matrix can be a residual weight matrix and the third matrix can be a skip weight matrix of an audio generation neural network layer. The system can generate the second and third matrices by training a model for a particular target computing device such that the residual weight matrix and the skip weight matrix each have a number of columns that is a multiple of the number of threads in a warp.

The system receives an input vector for the layer (340). The input vector can be a vector generated by a previous layer of the network or an initial vector input for the stack of layers in the network.

The system performs, by the plurality of thread blocks, the first matrix operation substantially in parallel (350). In other words, each independent processing unit executes a thread block, and multiple independent processing units perform portions of the first matrix operations over time windows that are substantially overlapping.

In some implementations, after performing the first matrix operation, the system performs, by the plurality of thread blocks, a synchronization. Performing the synchronization requires the thread blocks to communicate so that results generated by respective thread blocks can be assembled in memory of the parallel processing device.

The system performs, by the plurality of thread blocks, the second matrix operation substantially in parallel with performing, by the second subset of the plurality of thread blocks, the third matrix operation (360). In other words, the system each independent processing unit executes a thread block that performs part of the second matrix operation or the third matrix operation over time windows that are substantially overlapping.

The system outputs a result computed from the second matrix operation to the residual connection in the network and outputs a result computed from the third matrix operation to the skip connection in the network (370).

A number of implementations have been described above that specifically refer to rows and columns of a matrix. However, the same techniques can be applied equally if rows are interpreted as columns and vice versa.

In this specification, computing values in parallel or substantially in parallel means independent processing units perform operations toward generating the values over time windows that at least partially overlap. Computing values in parallel or substantially in parallel does not require all values to be computed at precisely the same time or in lockstep. In addition, some values generated by a single independent processing unit may actually be generated serially by the processing unit, but over a time window that overlaps with the computation of other values by other independent processing units.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
receiving weight matrices of a layer of a plurality of layers of a signal generation neural network, wherein each layer of one or more layers in the neural network has a residual connection to a subsequent layer, and wherein each layer of the plurality of layers has a skip connection, wherein for each layer:
a respective first weight matrix comprises values for a first matrix operation of the layer, and
a residual weight matrix and a skip weight matrix each comprise values for another matrix operation of the layer, wherein each of the other matrix operations depends on a result of the first matrix operation;
interleaving rows of the first weight matrix for the layer by assigning groups of rows of the first weight matrix to respective thread blocks of a plurality of thread blocks, each thread block being a computation unit for execution by an independent processing unit of a plurality of independent processing units of a parallel processing device, wherein the first weight matrix has a number of rows that is a multiple of a number of independent processing units of the parallel processing device, each independent processing unit being a streaming multiprocessor;
assigning groups of rows of the residual weight matrix to a first subset of the plurality of thread blocks and assigning groups of rows of the skip weight matrix to a second subset of the plurality of thread blocks that does not overlap with the first subset of the plurality of thread blocks;
receiving, by the layer, an input vector;
performing, by the plurality of thread blocks, the first matrix operation corresponding to the first weight matrix substantially in parallel;
after performing the first matrix operation corresponding to the first weight matrix:
performing, by the first subset of the plurality of thread blocks, the other matrix operation corresponding to the residual weight matrix substantially in parallel with performing, by the second subset of the plurality of thread blocks, the other matrix operation corresponding to the skip weight matrix; and outputting a result computed from the first subset of the plurality of thread blocks to the residual connection in the network and outputting a result computed from the second subset of the plurality of thread blocks to the skip connection in the network.

2. The method of claim 1, further comprising performing, by the plurality of thread blocks, a synchronization after performing the first matrix operation.

3. The method of claim 1, wherein the first subset of the plurality of thread blocks comprises half of the available thread blocks, and wherein the second subset of the plurality of thread blocks comprises another half of the available thread blocks.

4. The method of claim 1, wherein interleaving rows of the first weight matrix for the layer comprises assigning, to each thread block, at least one row of the first weight matrix.

5. The method of claim 1, wherein the residual weight matrix and the skip weight matrix each have a number of columns that is a multiple of a number of threads within a warp of the parallel processing device.

6. A system comprising: one or more computers and one or more storage devices storing instructions that are operable, when executed by the one or more computers, to cause the one or more computers to perform operations comprising:
receiving weight matrices of a layer of a plurality of layers of a signal generation neural network, wherein each layer of one or more layers in the neural network has a residual connection to a subsequent layer, and wherein each layer of the plurality of layers has a skip connection, wherein for each layer:
a respective first weight matrix comprises values for a first matrix operation of the layer, and
a residual weight matrix and a skip weight matrix each comprise values for another matrix operation of the layer, wherein each of the other matrix operations depends on a result of the first matrix operation;
interleaving rows of the first weight matrix for the layer by assigning groups of rows of the first weight matrix to respective thread blocks of a plurality of thread blocks, each thread block being a computation unit for execution by an independent processing unit of a plurality of independent processing units of a parallel processing device, wherein the first weight matrix has a number of rows that is a multiple of a number of independent processing units of the parallel processing device, each independent processing unit being a streaming multiprocessor;
assigning groups of rows of the residual weight matrix to a first subset of the plurality of thread blocks and assigning groups of rows of the skip weight matrix to a second subset of the plurality of thread blocks that does not overlap with the first subset of the plurality of thread blocks;
receiving, by the layer, an input vector;
performing, by the plurality of thread blocks, the first matrix operation corresponding to the first weight matrix substantially in parallel;
after performing the first matrix operation corresponding to the first weight matrix:
performing, by the first subset of the plurality of thread blocks, the other matrix operation corresponding to the residual weight matrix substantially in parallel with performing, by the second subset of the plurality of thread blocks, the other matrix operation corresponding to the skip weight matrix; and
outputting a result computed from the first subset of the plurality of thread blocks to the residual connection in the network and outputting a result computed from the second subset of the plurality of thread blocks to the skip connection in the network.

7. The system of claim 6, wherein the operations further comprise performing, by the plurality of thread blocks, a synchronization after performing the first matrix operation.

8. The system of claim 6, wherein the first subset of the plurality of thread blocks comprises half of the available thread blocks, and wherein the second subset of the plurality of thread blocks comprises another half of the available thread blocks.

9. The system of claim 6, wherein interleaving rows of the first weight matrix for the layer comprises assigning, to each thread block, at least one row of the first weight matrix.

10. The system of claim 6, wherein the residual weight matrix and the skip weight matrix each have a number of columns that is a multiple of a number of threads within a warp of the parallel processing device.

11. A non-transitory computer storage medium encoded with a computer program, the program comprising instructions that are operable, when executed by data processing apparatus, to cause the data processing apparatus to perform operations comprising:
receiving weight matrices of a layer of a plurality of layers of a signal generation neural network, wherein each layer of one or more layers in the neural network has a residual connection to a subsequent layer, and wherein each layer of the plurality of layers has a skip connection, wherein for each layer:
a respective first weight matrix comprises values for a first matrix operation of the layer, and
a residual weight matrix and a skip weight matrix each comprise values for another matrix operation of the layer, wherein each of the other matrix operations depends on a result of the first matrix operation;
interleaving rows of the first weight matrix for the layer by assigning groups of rows of the first weight matrix to respective thread blocks of a plurality of thread blocks, each thread block being a computation unit for execution by an independent processing unit of a plurality of independent processing units of a parallel processing device, wherein the first weight matrix has a number of rows that is a multiple of a number of independent processing units of the parallel processing device, each independent processing unit being a streaming multiprocessor;
assigning groups of rows of the residual weight matrix to a first subset of the plurality of thread blocks and assigning groups of rows of the skip weight matrix to a second subset of the plurality of thread blocks that does not overlap with the first subset of the plurality of thread blocks;
receiving, by the layer, an input vector;
performing, by the plurality of thread blocks, the first matrix operation corresponding to the first weight matrix substantially in parallel;
after performing the first matrix operation corresponding to the first weight matrix:
performing, by the first subset of the plurality of thread blocks, the other matrix operation corresponding to the residual weight matrix substantially in parallel with performing, by the second subset of the plurality of thread blocks, the other matrix operation corresponding to the skip weight matrix; and outputting a result computed from the first subset of the plurality of thread blocks to the residual connection in the network and outputting a result computed from the second subset of the plurality of thread blocks to the skip connection in the network.

12. The non-transitory computer storage medium of claim 11, wherein the operations further comprise performing, by the plurality of thread blocks, a synchronization after performing the first matrix operation.

13. The non-transitory computer storage medium of claim 11, wherein the first subset of the plurality of thread blocks comprises half of the available thread blocks, and wherein the second subset of the plurality of thread blocks comprises another half of the available thread blocks.

14. The non-transitory computer storage medium of claim 11, wherein interleaving rows of the first weight matrix for the layer comprises assigning, to each thread block, at least one row of the first weight matrix.

* * * * *